United States Patent [19]

Weyer et al.

[11] Patent Number: 5,414,143
[45] Date of Patent: May 9, 1995

[54] PREPARATION OF POLYOXYALKYLENE GLYCOL MONOETHERS OF MONOHYDRIC ALCOHOLS

[75] Inventors: Hans-Juergen Weyer, Mannheim; Rolf Fischer, Heidelberg; Gerhard Jeschek, Gruenstadt; Herbert Mueller, Frankenthal, all of Germany

[73] Assignee: BASF Aktiengesellschaft, Ludwigshafen, Germany

[21] Appl. No.: 24,904

[22] Filed: Mar. 2, 1993

Related U.S. Application Data

[63] Continuation of Ser. No. 843,820, Feb. 28, 1992, abandoned.

[30] Foreign Application Priority Data

Mar. 13, 1991 [DE] Germany ............... 41 08 045.9

[51] Int. Cl.$^6$ ............... C07C 41/01; C07C 41/02
[52] U.S. Cl. ............... 568/617; 568/606; 568/607; 568/616
[58] Field of Search ............... 568/617, 606, 607, 616

[56] References Cited

U.S. PATENT DOCUMENTS

| 4,481,123 | 11/1984 | Hentschel et al. . |
| 4,584,414 | 4/1986 | Pruckmayr ............... 568/617 |
| 4,658,065 | 4/1987 | Aoshima et al. . |
| 4,677,231 | 6/1987 | Aoshima et al. ............... 568/617 |
| 5,180,856 | 1/1993 | Stehr et al. . |

FOREIGN PATENT DOCUMENTS

| 64236 | 6/1982 | European Pat. Off. . |
| 336171 | 6/1989 | European Pat. Off. . |
| 382931 | 7/1990 | European Pat. Off. . |
| 159411 | 7/1979 | Japan . |
| 159824 | 3/1984 | Japan . |
| 158218 | 4/1985 | Japan . |
| 79223 | 10/1987 | Japan . |
| 211371 | 1/1988 | Japan . |
| 105029 | 5/1988 | Japan . |

OTHER PUBLICATIONS

T. and L. Shedlovsky in A. Weissberger, B. W. Rossiter (Ed.): Techniques of Chemistry, vol. I (1971) pp. 163-204.
Makromol. Chem. 190 (1989) 929.
Top. Curr. Chem. 76 (1978) 1.

*Primary Examiner*—Howard T. Mars
*Attorney, Agent, or Firm*—John H. Shurtleff

[57] ABSTRACT

Polyoxyalkylene glycol monoethers of monohydric alcohols are prepared by a process in which tetrahydrofuran or a mixture of tetrahydrofuran with a total of not more than 95 mol %, based on the amount of tetrahydrofuran used, of one or more comonomers from the group consisting of the cyclic ethers and acetals is polymerised in the absence of water and in the presence of a monohydric alcohol and of an anhydrous heteropoly acid catalyst.

8 Claims, 1 Drawing Sheet

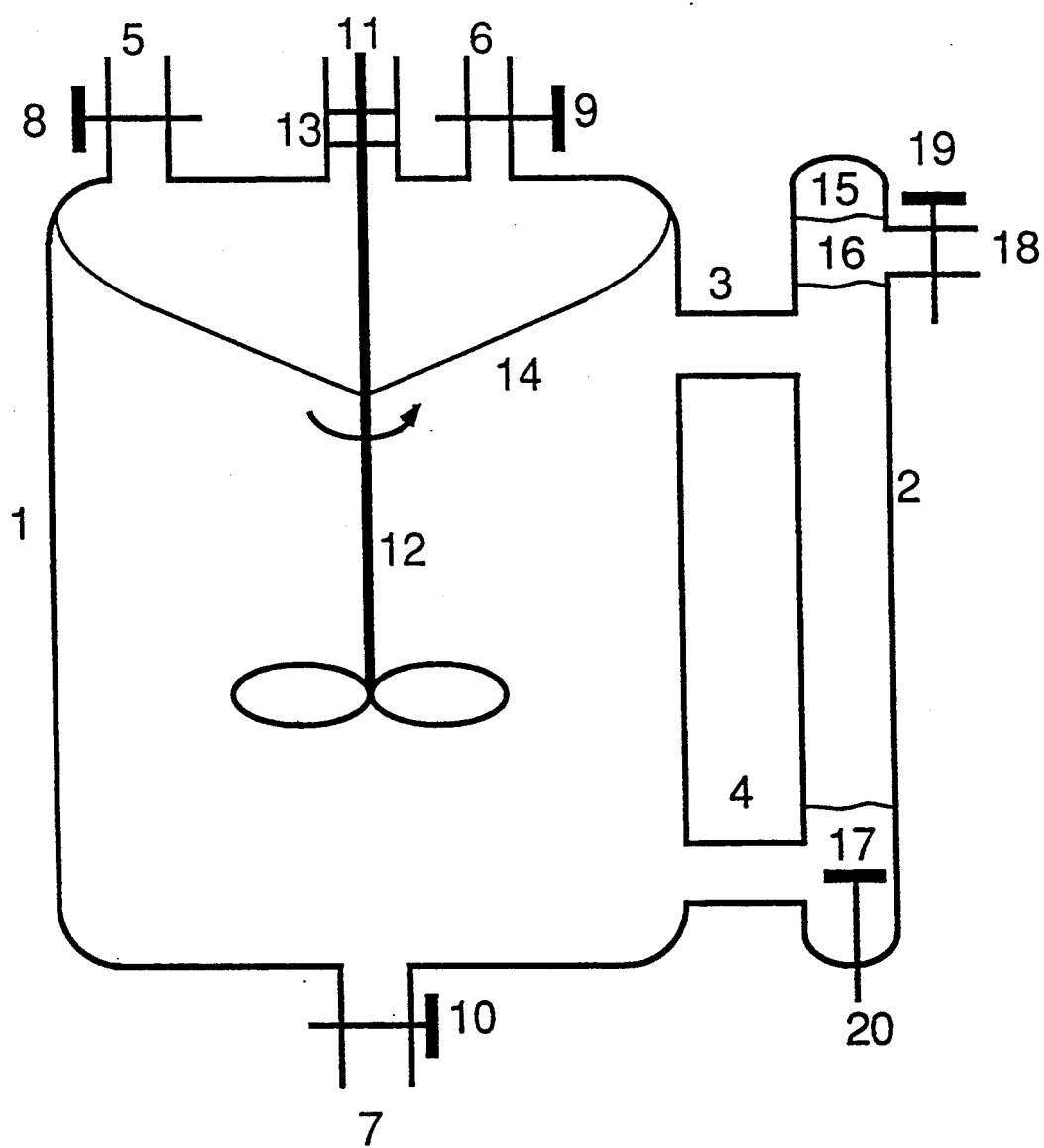

PREPARATION OF POLYOXYALKYLENE GLYCOL MONOETHERS OF MONOHYDRIC ALCOHOLS

This application is a continuation of application Ser. No. 07/834,820, filed Feb. 28, 1992, now abandoned.

The present invention relates to a process for the preparation of polyoxyalkylene glycol monoethers of monohydric alcohols.

According to JP-A 105 029/1988, polyether glycol monoethers are prepared via the cationic polymerization of cyclic ethers, such as tetrahydrofuran, with ring cleavage in the presence of monohydric alcohols with the aid of Lewis acid catalysts. Examples of such catalysts are boron trifluoride, antimony pentafluoride and aluminum trichloride. To initiate the polymerization reaction, it is also necessary to add a 3-membered or 4-membered ether, for example an epoxide or oxetane. The disadvantage of this process is that the polymerization cannot be carried out continuously in this process and the Lewis acid catalysts cannot be reused. Moreover, these Lewis acids are highly corrosive, so that the apparatuses which come into contact with them must be constructed from particularly corrosion-resistant special materials, making the process considerably more expensive. However, the most serious disadvantage of this process is that the polyether glycol monoethers produced by it have a broad molecular weight distribution. In many applications, however, polyether glycol monoethers having a narrow molecular weight distribution are required.

JP-A 159 824 (1984) describes a process for the polymerization of cyclic ethers with the aid of water-containing heteropolyacid catalysts in the presence of alcohols. According to this publication, however, only relatively short-chain polymers can be obtained. In an experiment for the preparation of polytetrahydrofuran monoisopropyl ether which was carried out according to this publication, it was not possible to isolate the polymeric product.

U.S. Pat. No. 4,658,065 relates to a process for the preparation of polyether polyols, in which tetrahydrofuran is copolymerized with polyhydric alcohols with the aid of water-containing heteropolyacid catalysts. This patent also proposes preparing polyoxyalkylene glycol monoethers by reacting the relevant cyclic ethers with monohydric alcohols and with water-containing heteropolyacid catalysts and/or water-containing reactants. However, under reaction conditions used according to this patent, only mixtures which are difficult to separate and consist of the relevant polyoxyalkylene glycols and polyoxyalkylene glycol monoethers and which furthermore have a broad molecular weight distribution are obtained.

It is an object of the present invention to provide an economical process for the preparation of polyoxyalkylene glycol monoethers of monohydric alcohols based on the monomer tetrahydrofuran, which makes it possible to prepare these polymers having average molecular weights of more than 500, in particular from 600 to 3500, dalton, and a narrow molecular weight distribution. This process should also be suitable for the continuous production of these polymers, and the polymers prepared by this process should as far as possible be colorless or have a low color number.

We have found that this object is achieved by a process for the preparation of polyoxyalkylene glycol monoethers of monohydric alcohols wherein tetrahydrofuran or a mixture of tetrahydrofuran with a total of not more than 95 mol %, based on the amount of tetrahydrofuran used, of one or more comonomers from the group consisting of the cyclic ethers and acetals, is polymerized in the absence of water and in the presence of a monohydric alcohol and of an anhydrous heteropolyacid catalyst.

The novel process is thus used for the preparation of polyoxyalkylene glycols which are based on tetrahydrofuran (THF) and are etherified at one end of the polyoxyalkylene glycol chain with a monohydric alcohol.

Such polyoxyalkylene glycol monoethers based on the monomer THF can, as far as their polyoxyalkylene glycol moiety is concerned, be prepared from THF or from THF and comonomeric, cyclic ethers and/or acetals by polymerization with ring cleavage. Examples are ethylene oxide, propylene oxide and other substituted epoxides, such as epichlorohydrin, 1,2-butylene oxide, 2,3-butylene oxide, isobutylene oxide, oxetane and oxetane derivatives, such as 3,3-dimethyloxetane, 3,3-bischloromethyloxetane, 5-membered, cyclic ethers and acetals, such as methyl tetrahydrofurans, 1,3-dioxolan, 6-membered, cyclic ethers, such as tetrahydropyran, 1,4-dioxane or 1,3-dioxane, 7-membered and higher membered, cyclic ethers, such as oxepan, crown ethers and cyclic oligomers of tetrahydrofuran. Mixtures of these comonomers with THF can of course also be polymerized.

In general, the comonomers are used in total amounts of not more than 95, preferably 0.1 to 70, in particular from 1 to 30, mol %, based on THF used. However, poly-THF monoethers of monohydric alcohols are particularly preferably prepared only from the monomer THF by the novel process.

For the purposes of the present invention, heteropolyacids are inorganic polyacids having 2 or more different central atoms which are formed from weak, polybasic oxo acids of a metal, preferably from the oxo acids of chromium, of molybdenum, of vanadium or of tungsten and/or the corresponding oxides of these metals ($CrO_3$, $MoO_3$, $V_2O_5$ or $WO_3$) and those of another metal or nonmetal, for example arsenic, boron, iodine, phosphorous, selenium, silicon, germaniumor tellurium, as mixed, partial anhydrides. As a rule, the atomic ratio of the first-mentioned elements to the last-mentioned elements in these heteropolyacids is from 2.5 to 12, preferably 9 or 12.

The following compounds are examples of heteropolyacids which may be used in the novel process: dodecamolybdatophosphoric acid ($H_3PMo_{12}O_{40} \cdot nH_2O$), dodecamolybdatosilicic acid ($H_4SiMo_{12}O_{40} \cdot nH_2O$), dodecamolybdatoceric(IV) acid ($H_8CeMo_{12}O_{42} \cdot nH_2O$), dodecamolybdatoarsenic(V) acid ($H_3AsMo_{12}O_{40} \cdot nH_2O$), hexamolybdatochromic(III) acid ($H_3CrMo_6O_{24}H_6 \cdot nH_2O$), hexamolybdatonickelic(II) acid ($H_4NiMo_6O_{24}H_6 5H_2O$), hexamolybdatoiodic acid ($H_5IMo_6O_{24} \cdot nH_2O$), octadecamolybdatodiphosphoric acid ($H_6P_2Mo_{18}O_{62} \cdot 11H_2O$), octadecamolybdatodiarsenic(V) acid ($H_6As_2Mo_{18}O_{62} \cdot 25H_2O$), nonamolybdatomanganic(IV) acid ($H_6MnMo_9O_{32} \cdot nH_2O$), undecamolybdatovanadatophosphoric acid ($H_4PMo_{11}VO_{40} \cdot nH_2O$), decamolybdatodivanadatophosphoric acid ($H_5Mo_{10}V_2O_{40} \cdot nH_2O$) dodecavanadatophosphoric acid ($H_7PV_{12}O_{36} \cdot nH_2O$), dodecatungstosilicic acid ($H_4SiW_{12}O_{40} \cdot 7H_2O$), dodecatungstophosphoricic acid ($H_3PW_{12}O_{40} \cdot nH_2O$), dodecatungstoboric acid ($H_5BW_{12}O_{40} \cdot nH_2O$), octadecatungstodiphosphoric acid ($H_6P_2W_{18}O_{62}14H_2O$), octadecatungstodiarsenic(V) acid ($H_6As_2W_{18}O_{62}14H_2$) and hexamolybdatohexatungstophosphoric acid ($H_3PMo_6W_6O_{40} \cdot nH_2O$). It is of course also possible to use mixtures of heteropolyacids. In the novel process, dodecatungstophosphoric acid, dodecamolybdatophosphoric acid, nonamolybdatophosphoric acid, dodecamolybdatosilicic acid and dodecatungstosilicic acid are preferably used because they are readily obtainable.

The free heteropolyacids are preferably used according to the invention, but it is also possible to use their salts, in particular their alkali metal and alkaline earth metal salts as catalysts. The heteropolyacids and their salts are known compounds and can be prepared by known processes, for example by the methods of Brauer (Editor): Handbuch der Präparativen, Anorganischen Chemie, pp. 1774–1798, Volume III, Enke, Stuttgart, 1981, or by the methods of Top. Curr. Chem. 76 (1978), 1.

The heteropolyacids prepared in this manner are generally in the hydrated form and, before being used in the novel process, are freed from the water present therein and bonded by coordinate bonds. This dehydration can advantageously be carried out thermally, for example by the method described in Makromol. Chem. 190 (1989), 929. Depending on the heteropolyacid used, another possible method for dehydrating the heteropolyacids is to dissolve the heteropolyacid in an organic solvent, for example in a dialkyl ether or alcohol, to displace the water with the organic solvent from its coordinate bond to the heteropolyacid and to distill off the water azeotropically with the solvent. Anhydrous heteropolyacids prepared by these methods can be introduced as a catalyst directly in the novel process.

The heteropolyacid catalysts can also be used in the novel process in the form of heterogeneous catalysts. For this purpose, the heteropolyacid is advantageously applied to a carrier which is inert under the reaction conditions, such as active carbon, silica, titanium dioxide or zirconium dioxide, by a conventional method, for example by impregnating the relevant carrier with a solution of the heteropolyacid in a solvent, preferably an organic solvent, and then drying it at from 100° to 300° C., preferably from 130° to 250° C., under reduced pressure until water is no longer detectable in the catalyst.

In principle, all types of monohydric alcohols can be used in the novel process, such as aliphatic and cycloaliphatic alcohols, for example cyclohexanol, and aromatic and araliphatic alcohols, for example benzyl alcohol. These may also carry substituents which are inert under the reaction conditions, such as alkyl, halogen or alkoxy. Unsaturated, aliphatic or cycloaliphatic alcohols, for example crotyl alcohol or cyclohexenol, can also be reacted. However, monohydric, aliphatic $C_1$–$C_{18}$-alcohols, in particular $C_1$–$C_8$-alcohols, are preferably used in the novel process. The use of monohydric $C_1$–$C_4$-alcohols, such as methanol, ethanol, propanol, isopropanol and tert-butanol, is particularly preferred.

In this patent, the term average molecular weight or average molecular mass is understood as the number average molecular weight $M_n$ of the polymers present in the polymer mixture formed.

The alcohol content of the reaction mixture influences the average molecular weight of the resulting polymer. As a rule, it is true that the higher the content of monohydric alcohol in the reaction mixture the lower is the average molecular weight of the resulting polymer. Accordingly, the average molecular weight of the polymer produced increases with decreasing alcohol content of the reaction mixture. At very low alcohol contents, a greater amount of cyclic oxyalkylene oligomers can be formed.

The alcohol content of the reaction mixture also influences its phase behavior. At high alcohol contents, the reaction mixture consists of a homogeneous phase, with the result that isolation of the catalyst may be more difficult subsequently during working up. At very low alcohol contents, the heteropolyacid is no longer completely dissolved by the reaction mixture. The novel process preferably employs alcohol contents of the reaction mixture where two homogeneous, liquid phases form in the reaction mixture, the heavier, lower phase containing the major part of the heteropolyacid catalyst and of the alcohol in addition to monomeric starting material and freshly formed polymer and the lighter, upper phase essentially being composed of the monomeric starting material and polymer dissolved therein, in addition to residual amounts of alcohol and catalyst.

Particularly in the batchwise embodiment of the novel process, alcohol contents of from 0.1 to 15, preferably from 1 to 8, mol of alcohol per mol of heteropolyacid are advantageously used. Since in the continuous operation of the novel process some of the alcohol dissolved in the upper phase which essentially contains product and monomer is continuously discharged together with the product from the reactor but the alcohol present in the lower phase essentially containing catalyst is consumed in the preparation of the polyoxyalkylene glycol monoether, it is advantageous to control the alcohol feed to the reaction mixture by supplementing the consumed and discharged alcohol in such a way that the abovementioned concentration ratios are established in the catalyst phase. Under these conditions, the reaction system described above and consisting of two homogeneous, liquid phases is formed, in which system polyoxyalkylene glycol monoethers of virtually any average molecular weights, in particular polyoxyalkylene glycol monoethers having average molecular weights of more than 500 dalton and particularly preferably the polyoxyalkylene glycol monoethers having the economically particularly important average molecular weights of from 600 to 3500 dalton can be prepared in a controlled manner and with good selectivity.

We have found that, for the preparation of polyoxyalkylene glycol monoethers having certain average molecular weights and a narrow molecular weight distribution, it is advantageous, particularly in the continuous process, if the alcohol concentration required for the preparation of such a polymer, in the catalyst phase, is as far as possible kept constant. In an advantageous continuous process, therefore, the alcohol in the reaction mixture is continuously replenished by adding fresh or recycled alcohol at the rate of consumption of the alcohol in the reaction, taking into account the alcohol discharged together with the product-containing upper phase, in such a way that the alcohol concentration in the catalyst phase is kept substantially constant. In the batchwise embodiment of the novel process, the abovementioned factors do not of course have such a critical effect on the result of the process as in the continuous process.

However, there was to date no reliable process by means of which it was possible to measure the alcohol concentration in the concentrated, heteropolyacid-containing catalyst phase; in particular, there was no method of measurement which enabled the alcohol concentration in this catalyst phase to be measured sufficiently rapidly and accurately in order to be able to regulate the feed of fresh alcohol according to the requirements of a continuous, industrial process via an analog control coupled therewith.

We have found that the concentration of the alcohol in the catalyst phase can be advantageously determined by measuring the electrical conductivity of the liquid catalyst phase. The measurement of the electrical conductivity can be carried out in the novel process, for example, with the aid of the techniques, circuits and measuring arrangements as described by, for example, T. and L. Shedlovsky in A. Weissberger, B. W. Rossiter (Ed.) Techniques of Chemistry, Volume I, pages 163–204, Wiley-Interscience, New York, 1971. The concentration of the relevant alcohol in the catalyst phase can be determined in a simple manner with the aid of the resulting conductivity measurement on the basis of a previously prepared calibration curve. As a rule, it is advantageous to prepare individual calibration curves for the different alcohol/heteropolyacid systems used. Since the conductivity measurement is an electrical measuring method, the measuring means can be very easily coupled to the alcohol metering apparatus for the purposes of analog control of the alcohol feed. This combined measuring and metering method has a very advantageous effect on the product quality, in particular in the continuous embodiment of the novel process.

The average molecular weight of the polyoxyalkylene monoether formed in the novel process is not dependent only on the amount of heteropolyacid catalyst added and of the alcohol but is also influenced by the type of heteropolyacid used or of the alcohol employed.

For example, under otherwise identical conditions, a polymer having an average molecular weight of 1900 is obtained in the reaction of THF and isopropanol with anhydrous dodecatungstophosphoric acid, whereas a polymer having an average molecular weight of 1500 is formed when dodecatungstosilicic acid is used and poly-THF monoethyl ether having an average molecular weight of 1900 is obtained when ethanol is employed as the monohydric alcohol, while with hexadecan-1-ol a poly-THF monohexadecyl ether having an average molecular weight of 3600 is formed.

By varying the amount and type of the heteropolyacid used or of the monohydric alcohol, it is therefore possible to tailor-make polyoxyalkylene glycol monoethers having a certain average molecular weight and at the same time a relatively narrow molecular weight distribution. These process parameters can as a rule be optimized by means of a few routine experiments.

The novel process can be carried out both continuously and batchwise. For this purpose, the heteropolyacid is advantageously used in amounts of from 10 to 300, preferably from 50 to 150, parts by weight, based on 100 parts by weight of the monomer used. It is also possible to add larger amounts of heteropolyacid to the reaction mixture.

The heteropolyacid can be added in solid form to the reaction and is then gradually solvated by bringing it into contact with the other reactants, with the formation of the liquid catalyst phase. It is also possible to adopt a procedure in which the solid heteropolyacid is made into a slurry with the alcohol and/or monomer to be used and the resulting catalyst solution passed into the reactor as a liquid catalyst phase. Both the catalyst phase and the monomeric starting material may be initially taken in the reactor. However, it is also possible for both components to be introduced simultaneously into the reactor.

The polymerization is usually carried out at from 0° to 150° C., preferably from 30° to 80° C. Atmospheric pressure is advantageously employed but the reaction under pressure, mainly under the autogenous pressure of the reaction system, may likewise prove advantageous.

Since the polymerization is preferably carried out in a two-phase system, it is necessary to ensure thorough mixing of the two phases. For this purpose, the reactors must be equipped with efficient mixing means, for example stirrers, both in the batchwise procedure and in the continuous one. In the batchwise process, a stirred kettle is generally used for this purpose, the two liquid phases being separated from one another after the end of the reaction.

Hewever, the continuous procedure is preferably used. The reaction can be carried out in conventional reactors or reactor arrangements suitable for continuous processes, for example in tube reactors which are equipped with baffles which ensure thorough mixing of the two-phase system, or in stirred kettle cascades, the reaction being followed by continuous separation of the catalyst phase from the monomer-containing and product-containing upper phase.

The single FIGURE drawing is a schematic illustration of an apparatus advantageously used for the continuous process of the invention, to be taken with the following description.

This apparatus is a stirred kettle 1 which is combined with a phase separator 2, is otherwise of a conventional design, may be equipped with either external or internal heating and is as a rule provided with separate inlet connections 5 for introducing the individual reactants and for flushing with inert gas. In the FIGURE, the kettle heating has been omitted for the sake of clarity and only one inlet connection 5, representing all others, has been drawn. Furthermore, an apparatus for pressure compensation 6 and an outlet connection 7 are installed on the reactor. All these apparatuses are provided with separate control apparatuses 8, 9 and 10, for example slide valves or valves, which permit opening and closing of these connections and regulation of the feed. The reactor is provided with a stirrer 12 which is connected to the outside by the guide 11 sealed with the bush 13. The stirred kettle 1 is connected to the phase separator 2 via the feeds 3 and 4 mounted roughly at the height of the upper and lower third, respectively. The product solution obtained in the reaction is removed from the apparatus via the outlet connection 18, which is advantageously mounted above the feed 3. The discharge of the product solution is regulated via the control apparatus 19, which may be, for example, a slide valve or a valve.

To operate this continuous apparatus, the reactants are initially taken in the reactor and are thoroughly mixed at the desired reaction temperature by means of the stirrer 12, an emulsion-like mixture of the catalyst phase and the upper phase being formed. The flow produced in the reaction mixture by the stirrer causes the emulsion-like mixture to pass via the feed 3 into the phase separator 2, in which the catalyst phase and the monomer-containing and product-containing upper phase separate owing to their different densities. The clear, colorless product-containing upper phase and the clear catalyst phase, the color of which differs according to the heteropolyacid used, separate from the cloudy, emulsion-like reaction mixture roughly above the dashed line 16 and below the dashed line 17, respectively. The product phase is removed via the outlet 18 while the catalyst phase flows back into the stirred kettle via the feed 4 owing to the suction generated by the stirrer 12 and is again fluidized there with the monomer-containing and product-containing upper phase. The lines 14 and 15 indicate the approximate liquid meniscus or liquid level in the stirred kettle and phase separator, respectively, during operation. Fresh monomer and fresh alcohol are introduced into the stirred kettle via the feed connection 5. The alcohol feed is controlled with the aid of the conductivity measuring cell 20 dipping into the liquid catalyst phase, in such a way that the desired alcohol content in the catalyst phase remains constant within the accuracy of regulation.

Fresh monomer is usually metered into the reactor in a controlled manner via a level regulator. Advantageously, fresh monomer is added at the rate at which the product and unconverted monomer are discharged from the reaction apparatus. In this way, it is also possible to control the residence time and hence the polymerization time, providing a further means for influencing and adjusting the average molecular weight of the resulting polymer. In general, the polymerization is carried out for from 0.5 to 50, preferably from 1 to 10, particularly preferably from 1 to 8, hours in the batchwise process, depending on the amount of catalyst and on the reaction temperature. In the continuous process, residence times from 1 to 8, preferably from 2 to 5, hours are usually established. At the beginning of the continuous reaction, the reaction system described requires a certain time before a steady-state equilibrium has been established and during which it may be advantageous to keep the outlet 18 closed with the aid of the control apparatus 19, ie. not to discharge product solution from the reaction apparatus.

The catalyst phase remains in the reaction apparatus and is constantly replenished by adding fresh catalyst and/or if necessary by recycling the discharged catalyst, according to the catalyst losses which result through the discharge of small amounts of catalyst with the product-containing upper phase.

If a heterogeneous heteropolyacid catalyst is used for the preparation of the poly-THF monoethers, said catalyst can be employed as a suspended catalyst but preferably as a fixed bed catalyst. Where a fixed bed catalyst is used, the reaction mixture can be passed over the heterogeneous heteropolyacid catalyst by the liquid phase or trickle bed procedure.

The novel process is advantageously carried out under an inert gas atmosphere, and any inert gas, such as nitrogen or argon, may be used. Before being used, the reactants are freed from any water or peroxides present therein.

The addition of organic solvents which are inert under the reaction conditions, for example aliphatic and aromatic hydrocarbons and halgenated hydrocarbons, is possible and may be advantageous in that separation of the catalyst phase and the upper phase is facilitated.

As a rule, the monomer serves both as a reactant and as a solvent in the novel process.

The polymer-containing upper phase can be worked up, for example, by neutralizing traces of heteropolyacid present therein by adding a base, for example an alkali metal or alkaline earth metal hydroxide solution, ammonia or an alkali metal or alkaline earth metal carbonate solution or bicarbonate solution, distilling off the monomer present therein and filtering the polyoxyalkylene glycol monoether remaining in the distillation residue in order to separate off precipitated salts. The monomer recovered in the distillation can of course be recycled to the reaction.

Using the novel process, it is possible to obtain polyoxyalkylene glycol monoethers of monohydric alcohols and in particular poly-THF monoethers of monohydric alcohols in an economical manner and in good yield, selectively and with a narrow molecular weight distribution and in pure form with low color numbers. The monoethers which can be prepared according to the invention are used, for example, for the preparation of special polyurethanes (JP-A 105 029/1988) and are also employed for special lubricating oils (EP-A 336 171), as additives for engine oils (JP-A 159 411/1979) and as spinning oils (JP-A 211 371/1988).

Since the polyoxyalkylene glycol monoethers obtainable by the novel process are formed in very pure form and with a narrow molecular weight distribution and their average molecular weight $M_n$ can be controlled in the novel process, it may be worthwhile liberating from these polyoxyalkylene glycol monoethers the corresponding polyoxyalkylene glycols having high purity, a defined average molecular weight and a narrow molecular weight distribution by hydrolysis of the monoether group under mild conditions, for example with the aid of an aqueous acid. The polyoxyalkylene glycol mono-tert-butyl ethers and in particular the poly-THF mono-tert-butyl ethers having average molecular weights of from 500 to 3500 are especially suitable for this purpose.

EXAMPLES

The average molecular weights ($M_n$) of the polymers prepared according to the examples were determined by gel permeation chromatography, a standardized polystyrene being used for calibration. The number average molecular weight $M_n$ was determined from the resulting chromatograms according to the equation $$M_n = \frac{\Sigma c_i}{\Sigma \frac{c_i}{M_i}}$$

where $c_i$ is the concentration of the individual polymer species i in the polymer mixture obtained and $M_i$ is the molecular weight of the individual polymer species i. The molecular weight distribution, referred to below as the dispersity D, was calculated from the ratio of the weight average molecular weight ($M_w$) and the number average molecular weight ($M_n$) according to the equation $$\frac{M_w}{M_n} = D$$

The weight average molecular weight $M_w$ was determined from the resulting chromatograms with the aid of the formula $$M_w = \frac{\Sigma c_i M_i}{\Sigma c_i}$$

The samples used for determining the dispersity had not been subjected to a prior molecular distillation for removing volatile, short-chain polymers, as is generally usual, and the value for D determined was therefore higher than would have been expected after a molecular distillation.

All reactants used were anhydrous and peroxide-free.

Example 1

100 g of THF, 1.3 g of isopropanol and 50 g of dried dodecatungstophosphoric acid were heated for 4 hours in an argon atmosphere at 60° C. with vigorous stirring in a glass flask provided with a stirrer and reflux condenser. After cooling to room temperature, the reaction mixture was separated into two liquid phases, and THF and isopropanol were distilled off from the upper phase. 20 g of a colorless, viscous polymer remained. The polyoxytetramethylene glycol monoisopropyl ether formed had an average molecular weight ($M_n$) of 1900 and a dispersity of 1.9.

Example 2

100 g of THF, 1.6 g of butan-2-ol and 50 g of dried dodecamolybdatophosphoric acid were heated for 5 hours at 50° C. in an argon atmosphere and with vigorous stirring in a glass flask provided with a stirrer and reflux condenser. After cooling to room temperature, the reaction mixture was separated into two liquid phases and THF and butan-2-ol were distilled off from the upper phase. 25 g of a colorless, viscous polymer remained. The poly-THF mono-2-butyl ether formed had an average molecular weight of 2100 and a dispersity of 1.8.

Example 3

100 g of THF, 2.9 g of n-octanol and 50 g of dried dodecatungstatophosphoric acid were heated for 6 hours at 60° C. in an argon atmosphere with vigorous stirring in a glass flask provided with a stirrer and reflux condenser. After cooling to room temperature, the reaction mixture was separated into two liquid phases and THF and n-octanol were distilled off from the upper phase. 21 g of a colorless, viscous polymer remained. The poly-THF monooctyl ether formed had an average molecular weight of 1500 and a dispersity of 1.9.

Example 4

100 g of THF, 2.2 g of cyclohexanol and 50 g of dried dodecatungstophosphoric acid were heated for 4 hours at 60° C. in an argon atmosphere and with vigorous stirring in a glass flask provided with a stirrer and reflux condenser. After cooling to room temperature, the reaction mixture was separated into two liquid phases and THF and cyclohexanol were distilled off from the upper phase. 25 g of a colorless, viscous polymer remained. The poly-THF monocyclohexyl ether formed had an average molecular weight of 1800 and a dispersity of 1.9.

Example 5

100 g of THF, 5.5 g of n-hexadecanol and 50 g of dried dodecatungstophosphoric acid were heated for 4 hours at 60° C. in an argon atmosphere with vigorous stirring in a glass flask provided with a stirrer and reflux condenser. After cooling to room temperature, the reaction mixture was separated into two liquid phases and THF and n-hexadecanol were distilled off from the upper phase. 35 g of a colorless, viscous polymer remained. The poly-THF monohexadecyl ether formed had an average molecular weight of 3600.

Example 6

100 g of THF, 1.0 g of ethanol and 50 g of dried dodecatungstophosphoric acid were heated for 4 hours at 60° C. in an argon atmosphere and with vigorous stirring in a glass flask provided with a stirrer and reflux condenser. After cooling to room temperature, the reaction mixture was separated into two liquid phases and THF and ethanol were distilled off from the upper phase. 23 g of a colorless, viscous polymer remained. The poly-THF monoethyl ether formed had an average molecular weight of 1100 and a dispersity of 1.7.

Example 7

1000 g of THF, 16 g of methanol and 500 g of dried dodecatungstophosphoric acid were heated for 4 hours at 60° C. in an argon atmosphere and with vigorous stirring in a glass flask provided with a stirrer and reflux condenser. Thereafter, 250 g/hour of THF, containing 1.6% by weight of methanol, were metered in for a further 100 hours and the same amount of organic phase was removed. The same volume of n-octane was added to the organic phase, liquid heteropolyacid separating out. After the two phases had separated, the organic phase was passed over active carbon, and the readily volatile constituents, such as THF, methanol and octane, were then removed under reduced pressure. The average THF conversion to a colorless viscous polymer was 23%. The resulting poly-THF monomethyl ether had an average molecular weight of 1900. The dispersity of the product obtained was 1.7 without molecular distillation.

Example 8

80 g of THF, 20 g of 1,4-dioxane, 3.6 g of isopropanol and 50 g of anhydrous dodecatungstophosphoric acid were heated for 4 hours at 60° C. in an argon atmosphere with vigorous stirring in a glass flask provided with a stirrer and reflux condenser. After cooling to room temperature, the reaction mixture was separated into two phases and unconverted THF, 1,4-dioxane and isopropanol were distilled off from the upper phase. 14 g of a clear, viscous polymer remained. The copolymeric polyoxyalkylene glycol monoisopropyl ether formed had an average molecular weight of 1600.

Comparative Example (for JP-A 159 824 (1984))

100 g of THF, 1.3 g of isopropanol and 50 g of undried dodecatungstophosphoric acid (water content: 25 mol of $H_2O$/mol of heteropolyacid) were heated for 4 hours at 60° C. in an argon atmosphere with vigorous stirring in a glass flask provided with a stirrer and reflux condenser. After cooling to room temperature, the reaction mixture was mixed with 0.5 l of chloroform and 0.5 l of water and stirred. After phase separation was complete, the solvent was distilled off from the chloroform phase. No residue remained.

Example 9

A supported catalyst which contained dodecatungstophosphoric acid on active carbon was used for the polymerization. The catalyst was prepared as follows:

150 g of undried dodecatungstophosphoric acid were dissolved in 1500 g of dried THF, 750 g of active carbon (Merck, particle size 0.5–0.85 mm) were added and stirring was carried out for two hours at room temperature. Thereafter, the supported catalyst was filtered off and, before being used, was dried at 150° C. under reduced pressure until water was no longer detectable in the catalyst. The supported catalyst contained 10% by weight of $H_3PW_{12}O_{40}$, 150 g of the catalyst prepared in this manner were arranged as a fixed bed in an oil-heated double-jacketed tube. A mixture of 330 g of THF and 4 g of ethanol were circulated over this catalyst at 60° C. for eight hours. The liquid phase was then evaporated down under reduced pressure. A clear, viscous residue of 6.5 g remained.

We claim:

1. A process for the preparation of a polymer which is a polyoxyalkylene glycol monoether of a monohydric alcohol, which comprises:

polymerizing tetrahydrofuran or a mixture consisting of tetrahydrofuran with a total of not more than 95 mol % based on the tetrahydrofuran used, of one or more comonomers selected from the group consisting of cyclic ethers and acetals, in the absence of water and in the presence of a monohydric alcohol and also in the presence of 10 to 300 parts by weight, per 100 parts by weight of the monomers used, of an acid catalyst consisting essentially of a solvated, anhydrous heteropolyacid, the content of the monohydric alcohol being chosen to form the reaction mixture into two homogeneous, liquid phases, wherein the lower heavier phase contains the major part of the heteropolyacid catalyst and of the alcohol in addition to monomeric starting material and freshly formed polymer and wherein the upper lighter phase is composed essentially of the monomeric starting material and polymer dissolved therein in addition to residual amounts of alcohol and catalyst.

2. A process as claimed in claim 1, wherein the cyclic ether used for the polymerization is tetrahydrofuran, and a polyoxybutylene glycol monoether of a monohydric alcohol is produced.

3. A process as claimed in claim 1, wherein the polymerization is carried out batchwise in the presence of from 0.1 to 15 mol of a monohydric alcohol per mol of heteropolyacid.

4. A process as claimed in claim 1, wherein the polymerization is carried out at from 0° to 150° C.

5. A process as claimed in claim 1, wherein the heteropolyacid is selected from the group consisting of dodecatungstophosphoric acid, dodecamolybdatophosphoric acid, nonamolybdatophosphoric acid, dodecamolybdatosilicic acid and dodecatungstosilicic acid.

6. A process as claimed in claim 1, wherein the monohydric alcohol is a monohydric $C_1$–$C_4$-alcohol.

7. A process as claimed in claim 1, wherein the heteropolyacid is used in an amount of from 50 to 150 parts by weight per 100 parts by weight of the monomers used.

8. A process as claimed in claim 1, wherein the reaction is carried out continuously in said two-phase system and an alcohol concentration of from 0.1 to 15 mol of alcohol per mol of heteropolyacid is established in said lower heavier phase containing the major part of said catalyst.

* * * * *

UNITED STATES PATENT AND TRADEMARK OFFICE
CERTIFICATE OF CORRECTION

PATENT NO.   : 5,414,143
DATED        : May 9, 1995
INVENTOR(S)  : Weyer et al.

It is certified that error appears in the above-identified patent and that said Letters Patent is hereby corrected as shown below:

Column 11:

Claim 1, line 26, change "polymerlzing" to --polymerizing--.

Signed and Sealed this

Eleventh Day of July, 1995

Attest:

BRUCE LEHMAN

*Attesting Officer*      *Commissioner of Patents and Trademarks*